United States Patent [19]
Wood

[11] Patent Number: 6,020,732
[45] Date of Patent: Feb. 1, 2000

[54] FLUX CANCELLING TRANSFORMER LINE CIRCUIT

[75] Inventor: Samuel F. Wood, Los Altos, Calif.

[73] Assignee: Modern Systems Research, Inc., Los Altos Hills, Calif.

[21] Appl. No.: 09/079,043

[22] Filed: May 14, 1998

[51] Int. Cl.[7] .............................. H01F 27/42; H04M 7/00
[52] U.S. Cl. .......................................... 323/356; 379/378
[58] Field of Search ..................................... 323/356, 357, 323/303, 275; 363/39, 47; 379/378, 385, 400, 413

[56] References Cited

U.S. PATENT DOCUMENTS

| | | | |
|---|---|---|---|
| 4,046,967 | 9/1977 | O'Neill .................................. | 379/385 |
| 4,046,968 | 9/1977 | Embree et al. ......................... | 379/378 |
| 4,096,363 | 6/1978 | Earp ...................................... | 323/357 |

*Primary Examiner*—Shawn Riley
*Assistant Examiner*—Rajnikant B. Patel
*Attorney, Agent, or Firm*—Marger Johnson & McCollom

[57] ABSTRACT

A flux cancelling transformer line circuit includes an AC current source that blocks AC current and passes DC current. The current source is connected between the primary and secondary windings of a transformer. Direct current flowing through the primary winding generates a magnetic flux. The current source passes the direct current to the secondary winding self-cancelling the DC flux created in the primary winding. Since DC current is coupled from the primary windings directly into the secondary windings, the same DC current flows in both windings. Thus, DC flux is precisely cancelled in the transformer. The current source includes a transistor, which is biased in a low impedance linear region by the DC signal and a capacitor that operates the transistor in a high AC impedance condition.

27 Claims, 1 Drawing Sheet

FLUX CANCELLING TRANSFORMER LINE CIRCUIT

BACKGROUND OF THE INVENTION

1. Field of the Invention

This invention relates generally to trans- former circuits and more particularly to flux cancelling transformer circuits used in telephone interface equipment.

2. Description of the Related Art

Transformers are used to couple telephones and telephone switching equipment together and provide excellent line isolation, balance, and current feeding. A typical telephone line transformer circuit is shown in FIG. 1.

The circuit in FIG. 1 provides loop current that powers external devices such as telephones and couples AC signals between primary and secondary sides of the transformer. Direct current (DC) signaling is used by a central office (not shown) to control interface circuitry connected to the transformer T1.

Transformer T1 includes primary windings P1 and P2 which are coupled together by a capacitor C1 to provide a series AC path between P1 and P2. Secondary windings S1 and S2 are connected in series and coupled to a secondary circuit such as a telephone device. Windings P1, P2, S1 and S2 typically have equal numbers of turns. Windings P1 and P2 are referred to collectively as the primary winding, while windings S1 and S2 are referred to collectively as the secondary.

A first battery feed resistor R1 is coupled between P1 and a 48 volt DC voltage supply (V−), while a second battery feed resistor R2 is coupled between P2 and ground. Resistors R1 and R2 limit current flowing in the transformer on short loops, and provide common mode isolation for the circuits. Transformer T1 includes a core of magnetic material.

When DC current flows in the primary side of the transformer, excess magnetic flux is generated in the core of T1. The transformer saturates if the excess magnetic flux is not cancelled. Flux saturation causes the transformer to distort or block AC signals passing between the primary and the secondary of the transformer. Transformer T1 must use a large core to prevent flux saturation caused by the direct current flowing through the primary winding. However, large transformers are expensive and add bulk and weight to the telephone system.

Numerous attempts have been made to reduce the size, weight and cost of transformers used in telephone interconnect circuits. The attempts have generally fallen into one of two techniques. The first technique involves generating an external compensation current and using that compensation current in the windings of the transformer to cancel the DC flux effects. An example of this technique is disclosed by Earp in U.S. Pat. No. 4,096,363, issued Jun. 20, 1978.

One problem with external compensation circuits is that the cancellation current is generated externally. Circuit tolerances in the external compensation circuitry generate a cancellation current that may not precisely match the DC loop current. Thus, a large and more expensive transformer is still needed to tolerate the unbalanced DC current.

Another problem with external DC compensation circuits is that in order to minimize the level of current needed to compensate the DC flux, the compensation winding used for flux cancellation must be wound with more turns. Thus, the compensation transformer is bigger and more expensive. The compensation transformer also operates less efficiently due to stray capacitance associated with the additional windings. Semiconductor circuitry used in external compensation circuits adds cost to the system and reduces overall system reliability. Externally generated cancellation current also requires an additional power supply which increases power consumption and heat dissipation in the transformer circuit.

A second technique for cancelling DC flux uses a separate compensation winding. An example of this technique is disclosed by Martin in U.S. Pat. No. 4,607,142, issued Aug. 19, 1986. One problem with this technique is that the extra winding used for flux cancellation adds cost and size to the transformer. To accommodate the extra winding, the transformer must have a bobbin which includes extra pins. These pins make the bobbin more expensive and bulkier.

Separate compensation windings can require a large number of turns in order to keep the compensation current low. This effects the overall performance of the transformer due to factors such as stray capacitance. Yet another problem is that semiconductor circuitry used to drive this extra compensation winding adds cost to the system and reduces overall reliability due to susceptibility to transients.

Accordingly, a need remains for a transformer line circuit that compensates for DC flux effects while overcoming the above-mentioned problems.

SUMMARY OF THE INVENTION

A flux cancelling transformer line circuit according to the present invention includes an AC current source that blocks AC current and passes DC current. The current source is connected between the primary and secondary windings of a transformer. Direct current flows through the primary winding generating a magnetic flux. The direct current is passed through the current source and into the secondary winding self-cancelling the DC flux generated in the primary winding. Since the current source couples the DC current from the primary windings directly into the secondary windings, the DC current flowing in the secondary windings is the same as the DC current flowing in the primary windings. Thus, the DC flux is precisely cancelled.

A capacitor is coupled between the primary winding and a common node to provide an AC current path to ground. Another capacitor is coupled between the secondary winding and a secondary circuit, such as a telephone, providing an AC current path to the secondary circuit.

The current source in one embodiment comprises a transistor coupled between the primary and secondary windings. A signal having an AC portion and a DC portion is coupled to the primary winding. The signal generates magnetic flux having an AC portion and a DC portion. A capacitor is coupled to the transistor in order to provide high AC impedance. The transistor, however, is biased to provide a low impedance path for DC signals. The AC portion of the signal is blocked by the transistor while the DC portion of the signal is coupled to the secondary winding. Thus, the DC portion of the magnetic flux is cancelled while AC portion of the signal is kept from distorting the AC signal on the primary winding.

The transformer line circuit in accordance with the present invention allows use of a small sized transformers without requiring separate flux cancellation circuitry. Since no external power supply or circuit is required, the flux cancellation circuit uses less power and is more accurate than existing flux cancellation transformer circuitry.

The foregoing and other objects, features and advantages of the invention will become more readily apparent from the following detailed description of a preferred embodiment of the invention which proceeds with reference to the accompanying drawings.

DETAILED DESCRIPTION

Figure 1:
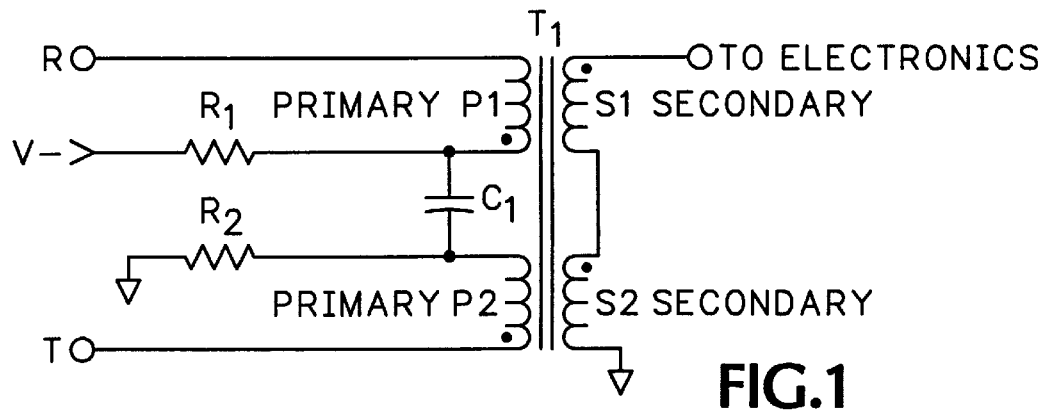
FIG. 1 is a schematic diagram of a prior art transformer line circuit.
Figure 2:
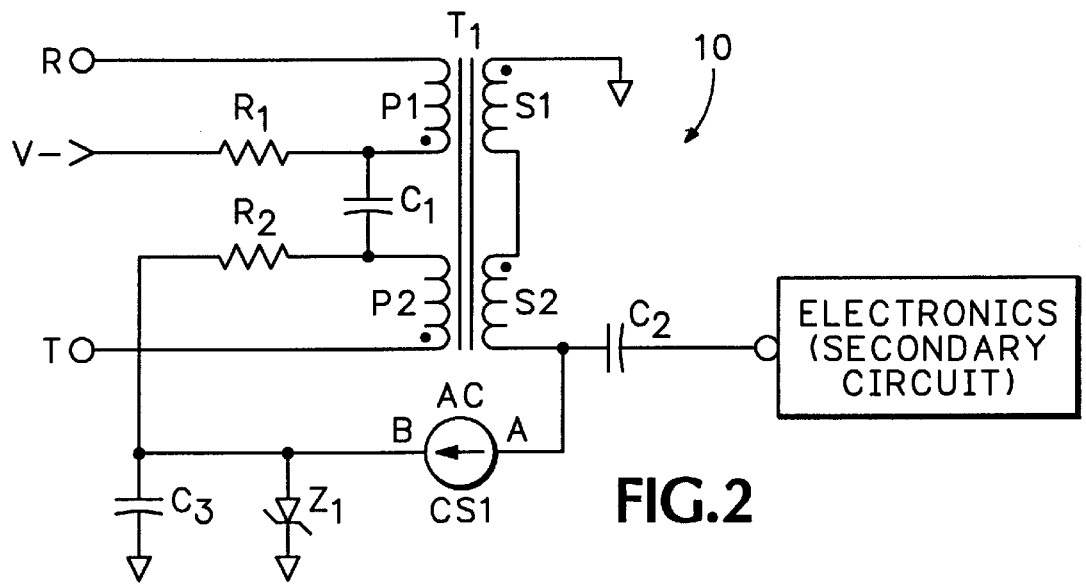
FIG. 2 is a schematic diagram of a flux self-cancelling transformer line circuit according to the present invention.

FIG. 2 is a circuit diagram of a transformer line circuit 10 in accordance with the present invention. The flux cancelling line current consists of the transformer line circuit shown in FIG. 1 with the addition of a flux cancelling circuit consisting of a DC current source. Prior to describing the detailed structure of the circuit 10, the key components of the circuit will be identified followed by a brief description of the operation of the system. Then a more detailed description of each of the components will be provided along with a more detailed description of the operation.

Referring to FIG. 2, a transformer T1 includes a primary winding formed by windings P1 and P2, and a secondary winding formed by windings S1 and S2. A current source CS1 is coupled between the primary and secondary windings and is alternatively referred to as a flux cancelling circuit. The current source (flux cancelling circuit) blocks an AC current signal while passing DC current. A capacitor C3 is connected between the primary winding and ground and a capacitor C2 connects the secondary winding to the electronics in a secondary circuit. The dots next to the terminals of windings P1, P2, S1 and S2 indicate the polarity of the windings. Power is provided by a battery (not shown) having a positive terminal connected to a common ground node and a negative terminal connected to the terminal V-.

In operation, the DC component of an electric signal applied to the primary winding flows through a DC current path formed by the primary windings P1 and P2, the current source CS1, and secondary windings S1 and S2. The primary and secondary windings are wound on transformer T1 so that the magnetic flux generated by the DC current flowing in the primary windings is cancelled by the DC current flowing in the secondary windings.

Since the current source CS1 couples the DC current from the primary windings directly into the secondary windings, the DC current flowing in the secondary windings is the same as the DC current flowing in the primary windings, and the DC flux is precisely cancelled. Thus, the typical large amount of core material required in the transformer to prevent saturation is not required, and the size, weight and cost of the transformer is reduced accordingly.

The AC component of the electric signal applied to the primary winding flows to ground through capacitor C3 which presents a low impedance path for AC signals. Capacitor C2 couples the AC signal from the secondary windings to a secondary circuit such as a telephone device. Capacitor C2 also isolates the DC component of the signal from the secondary circuit and forces the entire DC signal to flow through the secondary windings.

Transformer T1 includes split primary windings P1 and P2 which are referred to collectively as the primary winding. Transformer T1 also includes split secondary windings S1 and S2 which are referred to collectively as the secondary winding. The polarity of the windings P1, P2, S1 and S2 are indicated by the dots shown in FIG. 2.

Secondary windings S1 and S2 are wound around a core of magnetic material in the opposite direction from primary windings P1 and P2. Transformer T1 is a small audio coupling transformer such as model TTC-170-2, manufactured by Tomura. The total number of windings in the primary and secondary windings are the same so that the magnetic flux cancels properly.

One terminal of winding P1 is connected to a ring terminal R of a telephone line while the other terminal of P1 is connected to a negative power supply terminal V- through a battery feed resistor R1. One terminal of winding P2 is connected to a first terminal of a second battery feed resistor R2, while the other terminal of P2 is connected to a tip terminal T of the telephone line. Resistors R1 and R2 limit the current flowing through the transformer on short loops and provide common mode isolation. Resistors R1 and R2 have resistance values of approximately 200 to 400 ohms.

The second terminal of resistor R2 is connected to ground through a first terminal of capacitor C3 at node B. Capacitor C3 is preferably a large electrolytic capacitor having a capacitance value of approximately 100 microfarads. A transient suppressor Z1, which can be any suitable device such as a zener diode, is connected in parallel with capacitor C3. Capacitor C1 is used to couple AC signals between the two halves of primary winding P1 and P2.

The secondary winding S1 is connected between ground and a first terminal of secondary winding S2. A second terminal of secondary winding S2 is coupled to the current source CS1 at node A and to an electronic telephone device that communicates with the telephone line through capacitor C2. Capacitor C2 is preferably an electrolytic device having a capacitance of approximately 10 microfarads. The current source CS1 is connected between nodes A and B.

Figure 3:
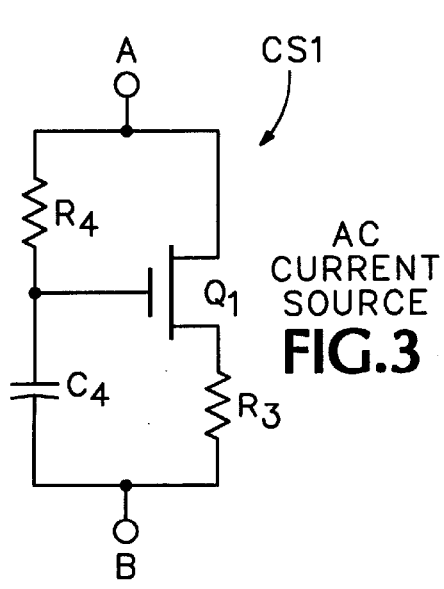
FIG. 3 is a detailed schematic diagram of an AC current source used in the transformer line circuit shown in FIG. 2.

FIG. 3 is a detailed diagram of one embodiment of the current source CS1 shown in FIG. 3. The current source CS1 includes a FET transistor Q1 having a drain terminal connected to node A. A resistor R3 is connected between the source terminal of Q1 and node B. The gate of transistor Q1 is connected to node A through a resistor R4 and to node B through a capacitor C4 which is preferably a ceramic disc capacitor having a value of about 0.1 microfarad. Resistor R3 preferably has a resistance of about 100 ohms. R4 equals 1 megaohm.

Figure 4:
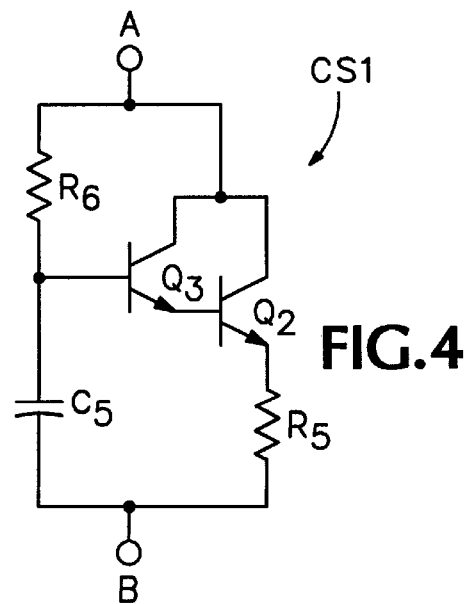
FIG. 4 is a schematic diagram of another embodiment for the AC current source shown in FIG. 2.

Another embodiment of a current source CS1 is shown in FIG. 4. The current source in FIG.4 includes two bipolar transistors Q2 and Q3 connected in a Darlington configuration with their collectors connected together at node A. The emitter of Q2 is connected to node B through a resistor R5 while the emitter of Q3 is connected to the base of Q2. The base of transistor Q3 is connected to node A through a resistor R6 and to node B through a capacitor C5. Transistors Q2 and Q3 can be any suitable individual small-signal devices which form a Darlington pair having high current gain, or they can be a combined Darlington pair in a single package.

Referring to FIGS. 2, 3 and 4, an electric signal is applied to the primary of transformer T1 which includes an AC portion which is coupled electromagnetically through the core of the transformer to the secondary circuit. A DC portion known as loop current, is used to power and control external telephone circuitry from a central telephone office. The electric signal generates a magnetic flux having a DC portion and an AC portion in the transformer. Power to the system is provided by a DC power supply such as a 48 volt battery having a negative terminal connected to the minus power supply terminal V−, and a positive terminal connected to ground.

The DC portion of the electric signal flowing through the primary winding is directed through current source CS1 into the secondary winding and then into ground. Since capacitors C2 and C3 present a high DC impedance to the current path, the DC current flowing in the primary winding is essentially the same as the DC current flowing in the secondary winding. Thus, the invention can use the direct current already flowing in the transformer to cancel out flux affects.

Using internal self-cancelling DC current provides more accurate flux cancellation while using less complex and more energy efficient compensation circuitry. Since no special flux cancellation winding is required, inexpensive, readily available, "off-the-shelf" production transformers can be used instead of more expensive custom designed transformers.

The AC portion of the electric signal applied to the primary winding generates an AC magnetic flux in the transformer which in turn induces an AC signal in secondary windings S1 and S2. The AC portion of the current flowing in the primary winding is directed to ground through capacitor C3 which presents a low AC impedance. Current source CS1 presents a high AC impedance between the primary and secondary windings. Thus, the only AC coupling between the primary and secondary side of the circuit is electromagnetically through the primary and secondary windings. Capacitor C2 couples AC signals between the secondary winding and the secondary circuit while preventing the DC portion of the signal from entering the secondary circuit.

Capacitor C3 and suppressor Z1 form a barrier to high voltage transients which may occur on the primary side of the circuit. High voltage transients are shunted to ground through Z1 and C3.

On short loops, the power dissipated in the core is limited by the battery feed resistors R1 and R2. The current embodiment shows the use of battery feed resistors R1 and R2. Other technologies or active circuits may be used in place of R1 and R2. The only requirement is that R1 and R2 have the same AC impedance so that their use won't unbalance the input circuit.

The operation of current source CS1 will now be described with reference to FIG. 3. FET transistor Q1 is biased on by resistor R4. Resistor R3 acts as a ballast resistor to bias Q1 in the linear region. DC current flows through the current source from node A to node B through Q1 and R3 since Q1 is biased on by R4.

AC signals are blocked from flowing through the transistor Q1 because capacitor C1 couples any AC signal present at node B to the gate of transistor Q1. With the gate of Q1 at the same AC potential as node B, no AC voltage exists across R3 presenting the drain of Q1 at a high AC impedance with respect to node B. Because current flowing in the drain of a FET is equal to current in the source, with no AC current in the source, no AC current can flow in the drain.

The resistance value of resistor R3 can be selected to accommodate various design considerations. A large resistance value will increase power dissipation, but keep transistor Q1 biased in the linear region. A small resistance value will decrease power dissipation, but provide less linear circuit response. A resistance value that is too small or too large will also cause nonlinear operation.

The embodiment of the current source shown in FIG. 4 operates similar to that shown in FIG. 3. Since the Darlington pair Q2 and Q3 have a very high current gain, they exhibit characteristics similar to the FET transistor Q1 in FIG. 2.

Other current sources have low voltage drops and can be alternatively used with the present invention. It is important for the current source to have high AC impedance. Preferably, the current source has no appreciable admittance at audio frequencies. The current source should also has a low DC voltage drop.

The terminal of secondary winding SI, which is connected to ground, may alternatively be connected to a positive power supply terminal, e.g., +5 volts, to compensate for any voltage drop across the current source and the transformer windings.

Having described and illustrated the principles of the invention in a preferred embodiment thereof, it should be apparent that the invention can be modified in arrangement and detail without departing from such principles. I claim all modifications and variations coming within the spirit and scope of the following claims.

I claim:

1. A transformer line circuit comprising:
a transformer having a primary winding and a secondary winding, the primary winding receiving both a direct current from a single power supply and an alternating current signal and the secondary winding transferring the alternating current signal to an external secondary circuit; and
a flux cancelling circuit connected to the transformer that forms only one single current path in the transformer that passes current from the primary winding directly through the secondary winding and then through the flux cancelling circuit back to the primary winding, the flux cancelling circuit allowing the same internal direct current in that same single current path to pass through the primary and secondary winding in a manner such that a magnetic flux created in the primary winding from the internal direct current in that same single current path is cancelled by an equal amount of flux produced by the same internal direct current flowing through that same single current path in the secondary winding without using a compensation current generated from any external compensation circuit,
the same flux cancelling circuit filtering the alternating current while allowing the magnetic flux generated by the alternating current to pass through the transformer from the primary winding to the secondary winding through that same single current path.

2. A transformer line circuit according to claim 1 wherein the flux cancelling circuit comprises a current source providing a low impedance direct current path between the primary winding and the secondary winding while simultaneously providing a high impedance path for the alternating current signal.

3. A transformer line circuit according to claim 2 including a capacitor coupled between the primary winding and a common node.

4. A transformer line circuit according to claim 2 wherein the primary winding and the secondary winding have the same number of turns and are wound in opposite directions thereby generating substantially the same direct current in the primary and secondary windings and in opposite directions.

5. A transformer line circuit according to claim 2 including a capacitor coupled between the secondary winding and the secondary circuit.

6. A transformer line circuit according to claim 2 wherein the secondary winding includes a terminal coupled to a common node.

7. A transformer line circuit according to claim 2 wherein the current source comprises a transistor having a first terminal coupled directly to the primary winding for receiving the direct current and the alternating current signal, a second terminal coupled directly to the secondary winding for outputting only the direct current, and a control terminal coupled between the first and second winding.

8. A transformer line circuit according to claim 7 wherein the current source further includes a capacitor coupled between the control terminal and the first terminal, the capacitor removing any alternating current signal between the first and second terminal of the transistor making the transistor a high impedance path for the AC signal.

9. A transformer line circuit according to claim 8 wherein the current source further includes a resistor coupled between the control terminal and the second terminal, the resistor biasing on the transistor in response to the direct current.

10. A transformer line circuit according to claim 7 wherein the current source further includes a resistor coupled between the first terminal and the primary winding for operating the transistor in a linear operating region.

11. A transformer line circuit according to claim 2 wherein the entire current source comprises only two transistors coupled in a Darlington pair arrangement having a first terminal connected directly to the primary winding and a second terminal connected directly to the secondary winding.

12. A transformer line circuit comprising:
   a primary winding for receiving an AC signal and a DC signal;
   a secondary winding; and
   a flux cancelling circuit coupled in series between the primary winding and the secondary winding, the flux cancelling circuit using only the AC signal and the DC signal to establish a single transformer current path that passes current from the primary winding, through the secondary winding and through the flux cancelling circuit and then back to the primary winding, the flux cancelling circuit allowing a common internal direct current in the single transformer current path to pass through the primary and secondary winding in a manner such that a magnetic flux created in the primary winding from the internal direct current in the single transformer current path is cancelled by an equal amount of flux produced by the same internal direct current flowing in the same transformer current path passing through the secondary winding without using a compensation current generated from any external compensation circuit,
      the same flux cancelling circuit blocking the alternating current while allowing the magnetic flux generated by the alternating current to pass through the transformer from the primary winding to the secondary winding through the same transformer current path.

13. A transformer line circuit according to claim 12 wherein the flux cancelling circuit includes:
   a transistor coupled between the primary winding and the secondary winding;
   means for providing a high AC impedance in the transistor between the primary winding and the secondary winding; and
   means for providing a low DC impedance in the transistor between the primary winding and the secondary winding.

14. A transformer line circuit according to claim 13 including means for coupling the AC signal from the primary winding to a common node.

15. A transformer line circuit according to claim 14 further including means for coupling the AC signal from the secondary winding to a secondary circuit.

16. A transformer line circuit according to claim 15 further including a power limiting circuit coupled to the primary winding.

17. A transformer line circuit according to claim 16 further including means for compensating for a voltage drop across the coupling means.

18. A method for cancelling magnetic flux effects in a telephone line transformer having a primary winding and a secondary winding, the method comprising:
   generating a signal having an AC portion and a DC portion, the AC portion comprising a telephone signal and the DC portion used for controlling telephone circuitry;
   coupling the signal to the primary winding; and
   coupling the primary winding directly to the secondary winding to establish only one single current loop in the entire telephone line transformer that passes current through the primary winding, the secondary winding and then back to the primary winding;
   providing a low impedance path through that one single current loop allowing an internal direct current to pass through the primary and secondary winding in a manner such that a magnetic flux created in the primary winding from the internal direct current in that same one single current loop is cancelled by an equal amount of flux produced by the same internal direct current flowing in that same single current loop in the secondary winding without using a compensation current generated from any external compensation circuit and without using any other AC or DC portion of any other signal,
      the low impedance path blocking the alternating current while allowing the magnetic flux generated by the alternating current to pass through the transformer from the primary winding to the secondary winding.

19. A method according to claim 18 including coupling the AC portion of the signal from the primary winding to a common node.

20. A method according to claim 18 including capacitively coupling the secondary winding to a secondary circuit thereby coupling the AC portion of the signal to the secondary circuit and blocking the DC portion of the signal from the secondary circuit.

21. A method according to claim 18 wherein blocking the AC portion of the signal includes:
   coupling a transistor between the primary winding and the secondary winding; and
   biasing the transistor in response to the AC portion of the signal to create a high AC impedance current path between the primary winding and the secondary winding.

22. A method according to claim 18 wherein coupling the DC portion of the signal to the primary winding includes:
   coupling a transistor between the primary winding and the secondary winding; and
   biasing the transistor in response to the DC portion of the signal to create a low DC impedance between the primary winding and the secondary winding.

23. A transformer line circuit according to claim 1 wherein the flux cancelling circuit drives direct current from the power supply in the primary winding directly into the secondary winding creating a secondary winding DC magnetic flux that offsets any DC magnetic flux existing in the primary winding.

24. A transformer line circuit according to claim 23 wherein no additional power supply is used in the flux cancelling circuit for generating direct current in the secondary winding.

25. A transformer line circuit according to claim 1 wherein the flux cancelling circuit comprises a single transistor coupled in series directly between the primary winding and the secondary winding.

26. A transformer line circuit according to claim 1 wherein the flux cancelling circuit filters the AC portion of the signal in the single current path passing from the secondary winding back to the primary winding and allows only the DC portion of the signal in the single transformer current path to pass from the secondary winding back to the primary winding.

27. A transformer line circuit according to claim 1 wherein the flux cancelling circuit compensates for DC flux in the primary winding independently of any sensed voltage level on the primary winding.

* * * * *